US011887550B2

(12) United States Patent
Llull et al.

(10) Patent No.: US 11,887,550 B2
(45) Date of Patent: Jan. 30, 2024

(54) VIEWING-ANGLE-DEPENDENT COLOR/BRIGHTNESS CORRECTION FOR DISPLAY SYSTEM

(71) Applicant: GOOGLE LLC, Mountain View, CA (US)

(72) Inventors: Patrick Llull, Mountain View, CA (US); John D. Perreault, Mountain View, CA (US); Andrew Huibers, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 12 days.

(21) Appl. No.: 17/639,406

(22) PCT Filed: Dec. 12, 2019

(86) PCT No.: PCT/US2019/066028
§ 371 (c)(1),
(2) Date: Mar. 1, 2022

(87) PCT Pub. No.: WO2021/118575
PCT Pub. Date: Jun. 17, 2021

(65) Prior Publication Data
US 2022/0319453 A1    Oct. 6, 2022

(51) Int. Cl.
*G09G 5/10*     (2006.01)
*G09G 3/34*     (2006.01)
(Continued)

(52) U.S. Cl.
CPC ........... *G09G 3/3426* (2013.01); *G06F 3/012* (2013.01); *G06F 3/013* (2013.01); *G09G 5/026* (2013.01);
(Continued)

(58) Field of Classification Search
CPC ...... G09G 3/3426; G09G 5/026; G06F 3/012; G06F 3/013
(Continued)

(56) References Cited

U.S. PATENT DOCUMENTS

2006/0274400 A1* 12/2006 Miles .................. G02B 26/001
                                                      359/291
2012/0062607 A1*  3/2012 Erinjippurath ......... G09G 3/342
                                                      315/294
(Continued)

FOREIGN PATENT DOCUMENTS

JP    2013236351 A    11/2013
WO    2013008282 A1    1/2013

OTHER PUBLICATIONS

International Preliminary Report on Patentability dated Jun. 23, 2022 for corresponding International Application No. PCT/US2019/066028, 17 pages.
(Continued)

*Primary Examiner* — Jonathan M Blancha (57) ABSTRACT

A display system including a tracking subsystem configured to track one of a pose of a head of a viewer or a pose of an eye of the viewer. The display system further includes an image correction module configured to, for each pixel of at least a subset of pixels of an input image, determine a pixel view angle for the pixel based on the pose of the head or the pose of the eye, determine a corrected pixel value based on an input pixel value of the pixel in the input image and based on the pixel view angle; and provide the corrected pixel value for the pixel in an angle-corrected image corresponding to the input image. The display system further includes a display panel to display the angle-corrected image.

20 Claims, 7 Drawing Sheets

(51) Int. Cl.
  *G06F 3/01* (2006.01)
  *G09G 5/02* (2006.01)
(52) U.S. Cl.
  CPC ............. *G09G 2320/028* (2013.01); *G09G 2320/0285* (2013.01)
(58) Field of Classification Search
  USPC ........................................................ 345/690
  See application file for complete search history.

(56) References Cited

U.S. PATENT DOCUMENTS

| | | | | |
|---|---|---|---|---|
| 2012/0081388 A1* | 4/2012 | Pan | .......................... | G09G 5/36 345/596 |
| 2014/0375698 A1* | 12/2014 | Zhang | ..................... | G09G 3/20 345/690 |
| 2016/0202758 A1* | 7/2016 | Peana | ..................... | G06F 3/013 345/601 |

OTHER PUBLICATIONS

International Search Report and Written Opinion dated Sep. 3, 2020 for corresponding International Application No. PCT/US2019/066028, 24 pages.

Communication pursuant to Article 94(3) EPC dated Aug. 1, 2023 for EP Application No. 19836743.5, 6 pages.

\* cited by examiner

VIEWING-ANGLE-DEPENDENT COLOR/BRIGHTNESS CORRECTION FOR DISPLAY SYSTEM

CROSS-REFERENCE TO RELATED APPLICATION

The present application is a U.S. National Stage under 35 U.S.C. § 371 of International Patent Application Serial No. PCT/US2019/066028, entitled "VIEWING-ANGLE-DEPENDENT COLOR/BRIGHTNESS CORRECTION FOR DISPLAY SYSTEM" and filed on Dec. 12, 2019, the entirety of which is incorporated by reference herein.

BACKGROUND

Many display devices have brightness or color responses that are view-angle-dependent due to radiometric and physical dependencies. For example, for liquid crystal displays (LCDs), bright pixels tend to dim as the view angle increases while dim pixels brighten as the view angle increases due in large part to the angle-dependent phase retardation of the liquid crystal (LC) molecules. Similarly, many displays employ polarization files in order to reduce reflections. However, these films have some variation in extinction ratio based on wavelength and viewing angle. Brightness changes based on viewing angle also is often color dependent, and thus an increased view angle can lead to undesirable color shift desaturation and loss of contrast in the displayed imagery.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The physical characteristics of the pixel matrix or the overlying polarizer film of many types of display panels result in the color and brightness of each pixel as perceived by a viewer as being dependent on the view angle of the pixel relative to the viewer. As a result, the further a viewer is positioned from the central viewing axis of the display panel (or the further to the edge a viewer's gaze direction extends in a near-eye display context), the more brightness and contrast are shifted or reduced. Disclosed herein are various embodiments of display systems that mitigate the spectral/angular response of such display panels through view-angle-dependent correction of the pixel values of an image before it is displayed at the display panel. In at least one embodiment, a display system tracks a viewer's head (or a viewer's eye (e.g., as a gaze direction or other eye pose) in a near-eye display implementation) and from this determines a current pose (of the head and/or eyes) of the viewer relative to a display panel. For each pixel of an input image intended for display at the display panel, the display system determines a pixel view angle for the pixel from the current pose. As used herein, the term "pose" can refer to one or both of a position and an orientation. Thus, for example, the pose of an eye can indicate one or both of the position of the eye or a gaze direction of the eye. The display system applies a correction to the pixel value (e.g., the red-blue-green (RGB) value) of the pixel based on its pixel view angle to generate an angle-corrected pixel value used in place of the original input pixel value. The correction applied to the pixel value represents a corrective adjustment to counteract a viewing-angle-dependent brightness or color response of the corresponding pixel of the display panel. This process is repeated for some or all of the pixels in the input image, and the resulting corrected image is provided to the display panel for display. In this manner, the brightness and contrast of each pixel in the image being displayed is adjusted as a function of the viewer's view angle of the corresponding pixel in the display panel.

For ease of illustration, example implementations are described with respect to one display panel. This one display panel can represent, for example, a single-panel display systems, such as a television, single-monitor computer system, smart phone, tablet computer, and the like. However, in other embodiments, the display system can include multiple display panels, in which case the view-angle-dependent image correction processes described herein can be performed concurrently for each display panel. To illustrate, in some embodiments, the display system is a stereoscopic display system having one display panel for each of the viewer's left eye and right eye, and in which the images provided to the left-eye display panel are subjected to the view-angle-dependent image process described herein based on the gaze direction or pose of the left eye, while a similar process is performed for the images provided to the right-eye display panel based on the gaze direction or pose of the right eye. As another example, the display system could include a stereoscopic lightfield display system in which a lenticular lens or other mechanism results in the provision of a separate image for each of a viewer's left and right eyes (or in some cases, a separate image for each eye of each of a plurality of viewers), and the view-angle-dependent image correction process could be applied for each image for each eye based on a gaze direction or other pose indication of the corresponding eye of the viewer.

Figure 1:
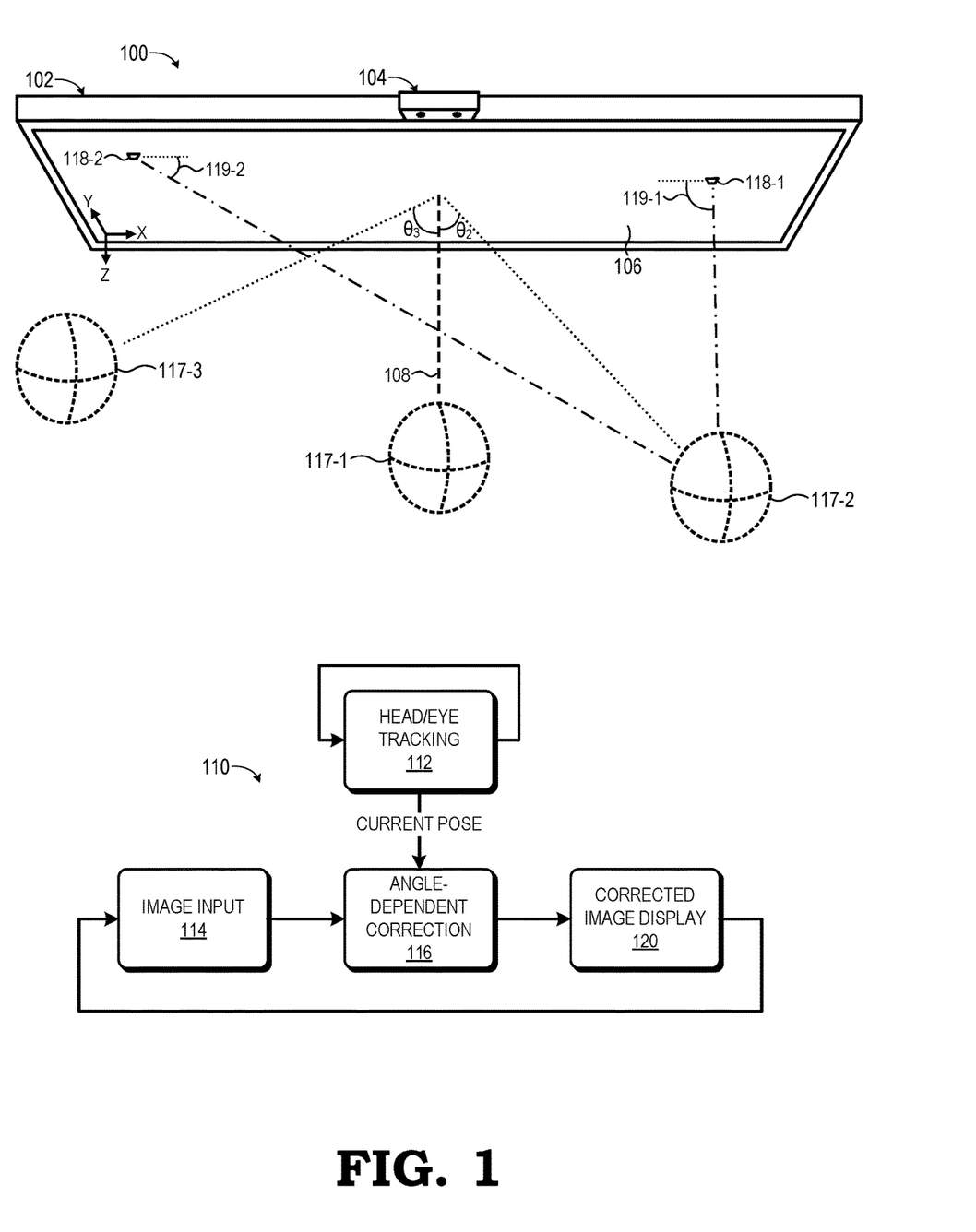
FIG. 1 is a block diagram of a display system employing a view-angle-dependent color/brightness correction process in accordance with some embodiments.

FIG. 1 illustrates a display system 100 employing a view-angle-dependent image correction process in accordance with at least one embodiment. The display system 100 comprises any of a variety of electronic systems utilized to display video or other imagery, including smartphones, tablet computers, laptop computers, computer monitors, video gaming devices, televisions and other panel displays, as well as near-eye display devices, such as augmented reality (AR) or virtual reality (VR) head-mounted devices, and the like. The display system 100 includes a display device 102 and a tracking subsystem 104. The display device 102 includes at least one display panel 106 composed of a matrix of pixels for displaying sequences of images to at least one viewer. In the illustrated embodiment, the display device 102 is a single-display system such as a television, computer monitor, smartphone, tablet computer, and the like. However, in other embodiments, the display device 102 can include, for example, a virtual-reality (VR) headset, an augmented-reality (AR) headset, or other near-eye stereoscopic display system, and thus include, for example, two display panels 106, one for each eye of the viewer, or a single display panel 106 that is used to present separate images to each eye of the viewer, such as through a lightfield display using a lenticular lens, through the use of polarizers or shutters, and the like.

The tracking subsystem 104 includes any of a variety of systems employed for viewer head tracking (in the case of a non-near-eye implementation, e.g. pose of head tracking) or for eye gaze tracking (in the case of a near-eye implementation, e.g. gaze direction tracking of a viewer) as known in the art. For example, the tracking subsystem 104 can include a stereoscopic camera subsystem that utilizes reflected infrared (IR) light to detect the presence of a viewer's face and further to detect the position and orientation (that is, the "pose") of the viewer's face to the display panel 106. For ease of reference, the systems and techniques of the present disclosure generally are described in the context of head tracking, but these descriptions apply equally to gaze tracking implementations for near-eye display configurations unless otherwise noted. Further, for purposes of the following, the pose of the viewer's face (or more generally, the viewer's head) is described herein with reference to a central viewing axis 108 that is normal (that is, perpendicular) to an X-Y plane defined by the display panel 106 (that is, extends along the Z-axis) at a point at the center of the display panel 106. However, in other embodiments, the pose may be defined relative to a different fixed reference, such as a center point between two cameras of the tracking subsystem 104, a specified corner of the display panel 106, and the like.

As illustrated by diagram 110 illustrating a general overview of the operation of the display system 100, at iterations of block 112 the tracking subsystem 104 continuously monitors for the presence of a viewer, and when detected, determines and periodically updates a current pose of the viewer's head relative to the central view axis 108 (or gaze direction in near-eye implementations). Concurrently, at an iteration of block 114 the display device 102 obtains an input image from a sequence of input images representative of a video stream. The input image comprises a plurality of pixel values, each pixel value corresponding to a pixel of the display panel 106. The input image can be a rendered image, an image captured from a live event, or a combination thereof. The video stream can be generated at the display device 102 itself (e.g., as the video stream generated by execution of a video game at the display device 102, as the video stream generated from the playback of a video file stored in a local storage drive or a digital versatile disc (DVD), and the like). In other embodiments, the video stream is generated remotely and transmitted to the display device 102, such as via a remote server and the like.

At a corresponding iteration of block 116, the display device 102 uses the current pose of the viewer's head (or gaze direction) to determine, for each pixel of the display panel 106 (or each pixel of an identified subset thereof) a corresponding pixel view angle for that pixel. For example, when the viewer's head is aligned with the central viewing axis 108 at, for example, head pose 117-1, the viewing angle is determined to be $\theta_1=0$ degrees (deg.), whereas a viewer's head at head pose 117-2 has a viewing angle $\theta_2$ represented by an angular component $\theta_{2X}$ along the X-axis and an angular component $\theta_{2Y}$ along the Y-axis (that is, $\theta_2=[\theta_{2X}, \theta_{2Y}]$). Likewise, a viewer's head at head pose 117-3 has a viewing angle $\theta_3$ represented by an angular component $\theta_{3X}$ along the X-axis and an angular component $\theta_{3Y}$ along the Y-axis (that is, $\theta_3=[\theta_{3X}, \theta_{3Y}]$). Thus, the pixel view angle is a function of the viewing angle and distance of the viewer's head from the display panel 106, as well as the (X,Y) position of the pixel within the display panel 106.

The pixel view angle for each pixel and the pixel value of that pixel is then used to determine a corrected pixel value that represents an adjustment of the pixel value so as to compensate for the expected angle-dependent display behavior of the corresponding pixel when viewed at by the viewer at the corresponding viewing angle. That is, $PV_{corr}=f(PV_{input}, \theta_{px}, \theta_{py})$, where $PV_{input}$ is the input pixel value from the input image, $\theta_{px}$ and $\theta_{py}$ are the X-axis component and Y-axis component, respectively of the pixel view angle of the pixel, and $PV_{corr}$ is the corrected pixel value for the pixel. As described in greater detail herein, the correction to be applied given a particular pixel value and pixel view angle can be determined empirically, via simulation or modeling, and the like, and can be implemented in any of a variety of transform structures, such as a look-up table (LUT), analytical function, and the like. As the impact on color and brightness of a displayed pixel is view-angle-dependent, the amount of correction applies typically increases as the pixel view angle increases, for a given pixel value. To illustrate, when the viewer's head is at pose 117-2, an input pixel for a pixel 118-1 of the display panel 106 that has a low or zero pixel view angle 119-1 typically would have a lower amount of correction applied compared to the same input pixel value for a pixel 118-2 of the display panel that has a relatively acute pixel view angle 119-2.

The process of view-angle-based pixel value correction is repeated for some or all of the pixels in the input image, resulting in an angle-corrected display image that is then output for display at the display panel 106 at a corresponding iteration of block 120. With the per-pixel angular correction applied, the displayed image exhibits improved color saturation, brightness, and contrast as observed by the viewer at larger viewing angles compared to a similar display of the original input image, particularly when the viewer's head is in a position that results in a relatively oblique viewing angle.

Figure 2:
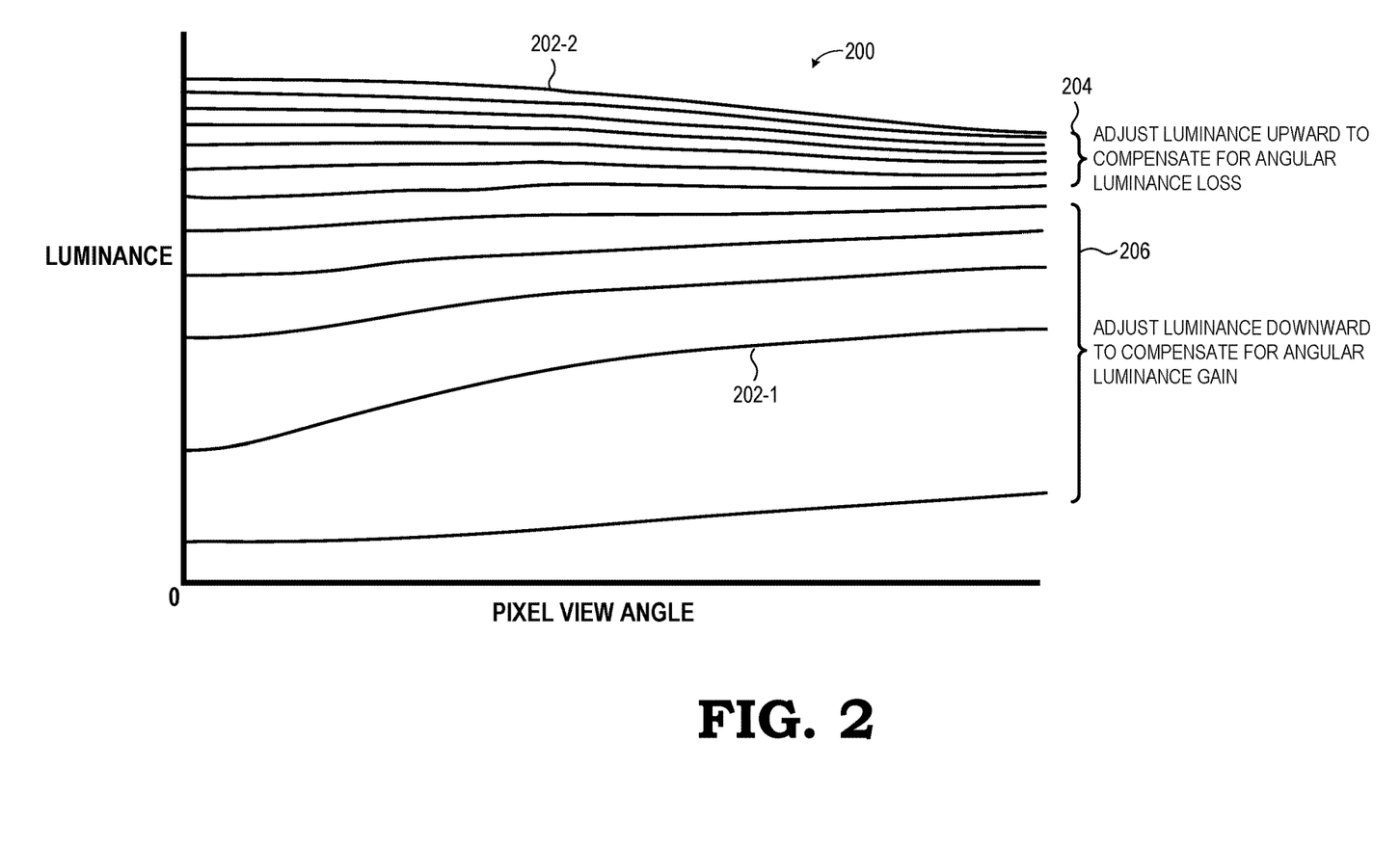
FIG. 2 is a diagram illustrating relationships between pixel view angle and luminance for a plurality of pixel values in accordance with some embodiments.

FIG. 2 illustrates a chart 200 depicting example relationships between luminance and pixel view angle for various pixel values. In the chart 200, the ordinate represents luminance of a pixel as observed by a viewer, the abscissa represents the pixel view angle of the pixel relative to the viewer, and each of the depicted ten line plots represents the relationship between luminance observed by the pixel for a corresponding pixel view angle for a corresponding pixel value of a set of ten pixel values. As illustrated by chart 200, the angular responses differ for different pixel values. For example, line plot 202-1 demonstrates that for a first pixel value, the pixel illuminated in accordance with that first pixel value actually has a gain in perceived luminance as the pixel view angle increases, whereas line plot 202-2 demonstrates an opposite relationship for a second pixel value— that is, that when the pixel is illuminated in accordance with the second pixel value, the observed luminance decreases as the pixel view angle increases. Accordingly, in at least one embodiment, the angle-dependent corrections applied by the display system 100 are configured so as to attempt to maintain approximately the same default luminance (that is, the luminance exhibited at a pixel view angle of 0 degrees) even as the pixel view angle increases. As demonstrated by bracket 204, this can involve a correction that increases the brightness of the pixel value for those pixel values that experience luminance loss as pixel view angle increases, and as demonstrated by bracket 206, this also can involve a correction that decreases the brightness of the pixel value for those pixel values that experience luminance gain as pixel view angle increases.

Figure 3:
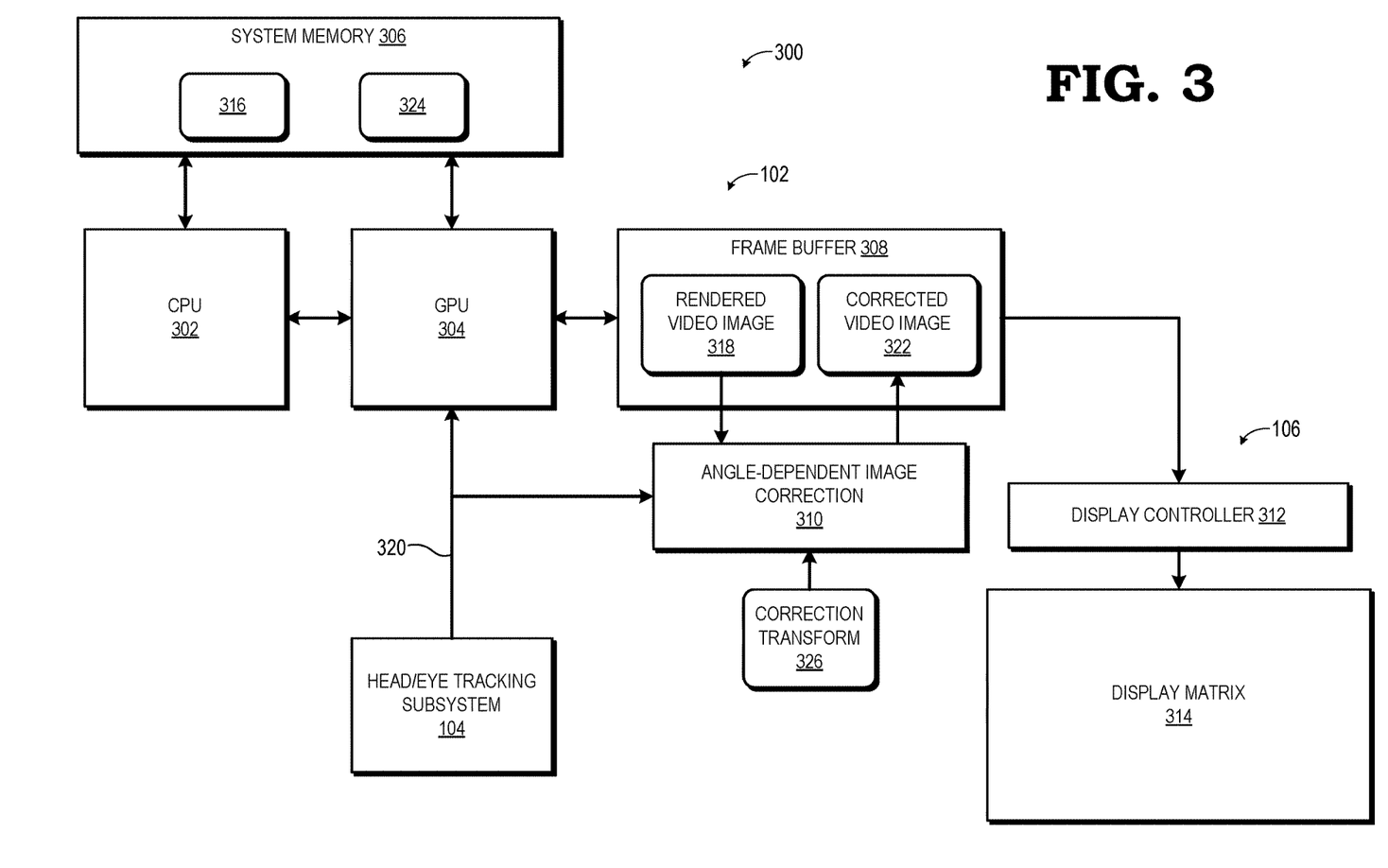
FIG. 3 is a block diagram of a hardware configuration of the display system of FIG. 1 in accordance with some embodiments.

FIG. 3 illustrates a simplified hardware configuration 300 of the display system 100 of FIG. 1 in accordance with some embodiments. In the depicted example, the display device 102 includes one or more central processing units (CPUs) 302, one or more graphics processing units (GPUs) 304, at least one system memory 306, a frame buffer 308, and an angle-dependent image correction module 310 (referred to herein as "image correction module 310" for purposes of brevity). The display panel 106 includes a display controller 312 and a pixel matrix 314 composed of a two-dimensional array of pixels, such as liquid crystal (LC)-based pixels, light emitting diode (LED)-based pixels, organic LED (OLED)-based pixels, or combinations thereof.

The illustrated configuration represents embodiments in which the display device 102 is the source of the input video stream being displayed. Accordingly, the CPU 302 operates to execute a video source application 316 stored in the system memory 306 that serves to direct the GPU 304 to render a stream of input images (e.g., input image 318), each of which is temporarily stored in the frame buffer 308. For example, the video source application 316 can include a video game application that results in the rendering of a stream of video images representative of the player's viewpoint into a video game scene. As another example, the video source application 316 can include a video decoding application executed to decode encoded video data stored on a hard disc or other mass storage device (not shown) to generate a sequence of decoded input images. In other embodiments, the video data is sourced by a remote device, such as a remote video server, in which case the video data is received at the display device 102 via a wireless or wireless network, temporarily buffered, and decoded or otherwise processed to generate the video stream composed of input images.

The image correction module 310 is implemented as hardcoded or programmable (e.g. free programmable, parametric programmable) logic, as one or both of the CPU 302 or GPU 304 executing correction software 324 representing the functionality described herein, or a combination thereof. In instances wherein the input images are rendered at the display device 102, the correction software 324 can be implemented as part of the rendering software. In instances where the input images are decoded or otherwise recovered from previously-encoded video data, the correction software 324 can be implemented as part of the decoding software The image correction module 310 operates to receive current pose data 320 representative of the current pose of the viewer's head (or current gaze direction), and from this information, modify the pixel values of the input image 318 based on the viewing angle represented by the viewer's current pose (or current gaze direction) to generate a corrected image 322. In embodiments wherein the input image 318 is being rendered by the GPU 304, this correction process can be part of the rendering process itself (e.g., as part of, or following, the pixel shader stage) such that the pixel values are corrected as the image itself is being generated, and thus the input image 318 and the corrected image 322 are the same image. In other embodiments, such as when the input image 318 is generated elsewhere (such as when the display device 102 decodes encoded video data to obtain the input image 318), the correction process can be applied as each pixel value of the input image 318 is obtained or after the input image 318 is fully obtained.

In at least one embodiment, the image correction module 310 determines the corrected pixel value for an input pixel value of the input image 318 using a correction transform component 326 that represents a specified relationship between input pixel value, pixel view angle, and desired corrected pixel value (typically on a per-color-channel basis, as described in greater detail below). As such, the correction transform component 326 can be implemented as, for example, a LUT that takes as input the input pixel value and the pixel view angle and outputs a corrected pixel value, or as a software-implemented or hardware-implemented analytic function that receives these same inputs and provides a corresponding corrected pixel value. The operation of the image correction module 310 and the correction transform component 326 are described in greater detail below with reference to FIGS. 4-8.

When angle-dependent correction has been applied to all applicable pixel values, the resulting corrected image 322 is transmitted to the display controller 312, which then operates to drive the individual pixels of the pixel matrix 314 according to the corresponding corrected pixel value in the corrected image 322, and thus displaying an image to the viewer that has been corrected or otherwise adjusted to accommodate the viewer's particular viewing angle.

Figure 4:
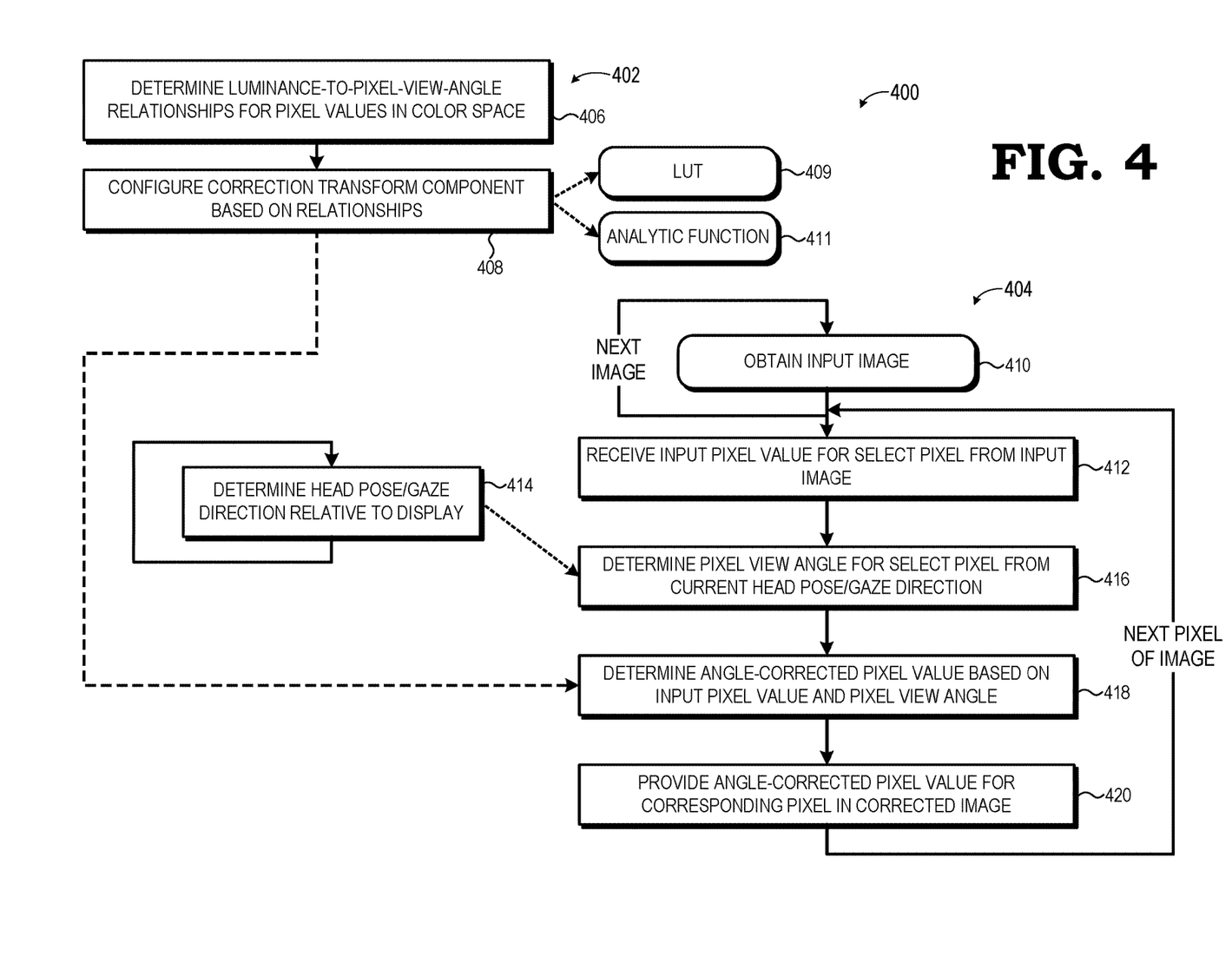
FIG. 4 is a flow diagram illustrating a method for view-angle-dependent image correction in accordance with some embodiments.

FIG. 4 illustrates an example method 400 for generation and display of viewing-angle-corrected images at the display device 102 in accordance with some embodiments. For ease of illustration, the method 400 is described with reference to the hardware configuration 300 for the display system 100 of FIG. 3. The illustrated method 400 is composed of two subprocesses: an angle-dependent correction configuration subprocess 402 and an angle-dependent correction application process 404. The angle-dependent correction configuration subprocess 402 represents the process employed to initialize or otherwise configure the angle-dependent correction scheme to be applied by the display device 102. Generally, the angle-dependent behavior exhibited by the display panel 106 depends on the technology or physical parameters of its pixel matrix 314 (e.g., LED, LCD, OLED) or overlying polarizing film, the manufacturing process for employing that technology, as well as variations in the implementation of the manufacturing process for that particular instance of the display panel 106.

As such, the luminance/pixel view angle relationship for a given pixel value typically is dependent on one or more of the display technology, manufacturing process, panel design, emitter natural angular illumination profile, etc. Accordingly, at block 406 a manufacturer, supplier, implementer, or user of the display device 102 determines the luminance-to-pixel-view-angle relationship for each applicable pixel value in the corresponding color space of the display device 102. In at least one embodiment, this is determined on a per-color-channel basis. To illustrate, assuming the color space is an RGB color space, the luminance/angle relationship is separately determined for each applicable red color component value, each applicable green color component value, and each applicable blue color component value. In one embodiment, the luminance/angle relationships are determined empirically via testing/measurement of the display panel 106 itself, or a representative instance of the display panel 106. To illustrate, a block of pixels of the display panel 106 can be configured to display a certain pixel value, and then a luminance/color meter can be positioned at different pixel view angles relative to the pixel block and a luminance/color measurement taken at each position, and from these readings a relationship between luminance and view angle, such as those represented in the line plots of chart 200, can be determined for the corresponding pixel value (or color component value thereof). In other embodiments, the luminance/angle relationships are determined through simulation, modeling, or other such analysis.

With the luminance/angle relationships determined, at block 408 the correction transform component 326 is configured to reflect these relationships. As described above, in at least one embodiment the correction transform component 326 is implemented as a LUT (e.g., LUT 409) that takes as an inputs a pixel value (e.g., a color component value) and a pixel view angle and provides a corrected pixel value in response, where the corrected pixel value is determined or selected such that when a pixel of the pixel matrix 314 is driven by the display controller 312 based on the corrected pixel value, the light emitted by the pixel and observed at the pixel view angle is substantially similar in brightness and color to the light emitted by the pixel when driven by the input pixel value and observed head-on (that is, at a 0 degree view angle). That is, the corrected pixel values of the LUT for a given input pixel value are configured for each applicable pixel view angle so as to provide an approximately constant luminance that is substantially independent of pixel view angle. In other embodiments, the correction transform component 326 is implemented using a different structure, such as an analytic function (e.g., analytic function 411), implemented in software or hardware, and configured in a similar manner so as to determine a corresponding corrected pixel value for each input pixel value/pixel view angle tuple so that the resulting corrected pixel value, when used to drive a pixel of the pixel matrix 314, results a substantially constant brightness or illumination for the corresponding pixel view angle. In at least one embodiment, this process is employed on a color basis by applying the above-described approach to each color channel independently; thus, color is preserved when the luminance ratio of the color elements (for example, the RGB channels) is preserved as a function of viewing angle. If one of the corrected pixel values exceeds the maximum value of the display ("clipping"), the color can be preserved by reducing the non-clipped channels in accordance with the display's gamma transformation such that the luminance ratio is preserved, at the expense of local texture.

With the display device 102 so initialized, the method 400 moves to the angle-dependent correction application process 404 for providing angle-dependent correction to input images of a video stream prior to display. Accordingly, at block 410, the display device 102 obtains an input image (e.g., input image 318) to be processed for a video stream being displayed at the display device 102. As noted above, in some embodiments this input image is obtained through local rendering of the input image at the display device 102, while in other embodiments the input image is obtained through decoding or other such processing of video data representative of the video stream, such as video data received from a remote server or other remote source via a network connection or video data obtained from a local mass storage device. At block 412, the image correction module 310 selects a pixel and obtains the pixel value of the input image for that pixel. In instances wherein the input image is locally rendered, the pixel selected can be the current pixel being rendered by the GPU 304. In instances wherein the input image is generated remotely, the image correction module 310 can select pixels from the input image in a predefined order, such as row-by-row, column-by-column, block-by-block, or as each pixel value is determined during a decoding process or other image restoration process. As illustrated by block 414, the view tracking subsystem 104 monitors the pose of the viewer's head (or gaze direction/eye pose for near-eye display implementations) and provides the head pose data 320 (FIG. 3) representative of the currently-observed head pose (or gaze direction/eye pose) to the image correction module 310. Accordingly, at block 416 the image correction module 310 determines the pixel view angle for the pixel selected at block 412 based on the current viewing angle (that is, the angle of the viewer's head at the current pose relative to the central viewing axis 108, FIG. 1, or other fixed reference) and the position of the pixel in the display panel 106 relative to the central viewing axis 108 or other reference point. As described above, in one embodiment, the pixel view angle can be represented using an X-axis component $\theta_{px}$ and a Y-axis component $\theta_{py}$ relative to the X-Y plane formed by the display face of the display panel 106. In other embodiments, it may be assumed that the viewer's head is relatively fixed along a particular axis, and thus the pixel view angle is instead represented by only a single angular component relative to the other axis. To illustrate, in some instances, such as for fixed desktop-mounted televisions or computer monitors, that the viewer's head will remain at the same height relative to the display panel 106, but may roam horizontally as the viewer shifts position, and thus the Y-axis component of the pixel view angle may be fixed to 0 degrees or otherwise disregarded.

With the pixel value and pixel view angle determined for the selected pixel, at block 418 the image correction module 310 determines an angle-corrected pixel value based on these parameters. As explained above, this determination process is performed through the configuration of the correction transform component 326 to adjust for measured or theorized angle-dependent luminance changes exhibited by a specified set of pixel values. To illustrate, for a LUT-based or analytical-function-based implementation, the image correction module 310 provides the pixel value and the pixel-view-angle as inputs and receives as an output an angle-corrected pixel value. In some embodiments, this correction process is performed separately for each color component of the pixel value. For example using the RGB color space, the range of red color component values is tested or simulated to generate a corresponding set of LUT entries or analytic function configurations representing the angle-corrected red color value to be used in place of each input red color value, and this same process can be repeated for each of the green and blue color value ranges.

In other embodiments, the entire color component tuple representing a complete pixel value is used to determine a corresponding corrected color component tuple for the corrected pixel value. To illustrate using, for example, the 24-bit RGB color space, the RGB888 value RGB[r1, g1, b1] for the pixel can be converted to a corresponding YUV444 value YUV[y1, u1, v1] in the YUV space using the standard RGB888-to-YUV444 conversion, and then the original luminance component value y1 can be replaced with a corrected luminance component value y2 based on the luminance-to-angle relationship (determined at block 406 and implemented at block 408) for the RGB888 value to generate a corrected YUV444 value YUV[y2, u1, u1], which then can be converted back to a corresponding RGB888 value RGB[r2, g2, b2], which serves as the corrected pixel value for the input pixel value and pixel view angle combination.

At block 420, the image correction module 310 replaces or otherwise substitutes the corrected pixel value for the corresponding input pixel value in the corresponding angle-corrected image 322 (FIG. 3). The process of blocks 412, 416, 418, and 420 is repeated for each pixel (or designated subset of pixels) of the input image 318. Once all applicable pixels have been corrected for viewing angle, the resulting angle-corrected image 322 is provided for display as described above, and method 400 returns to block 410 for processing the next input image in the video sequence.

Figure 5:
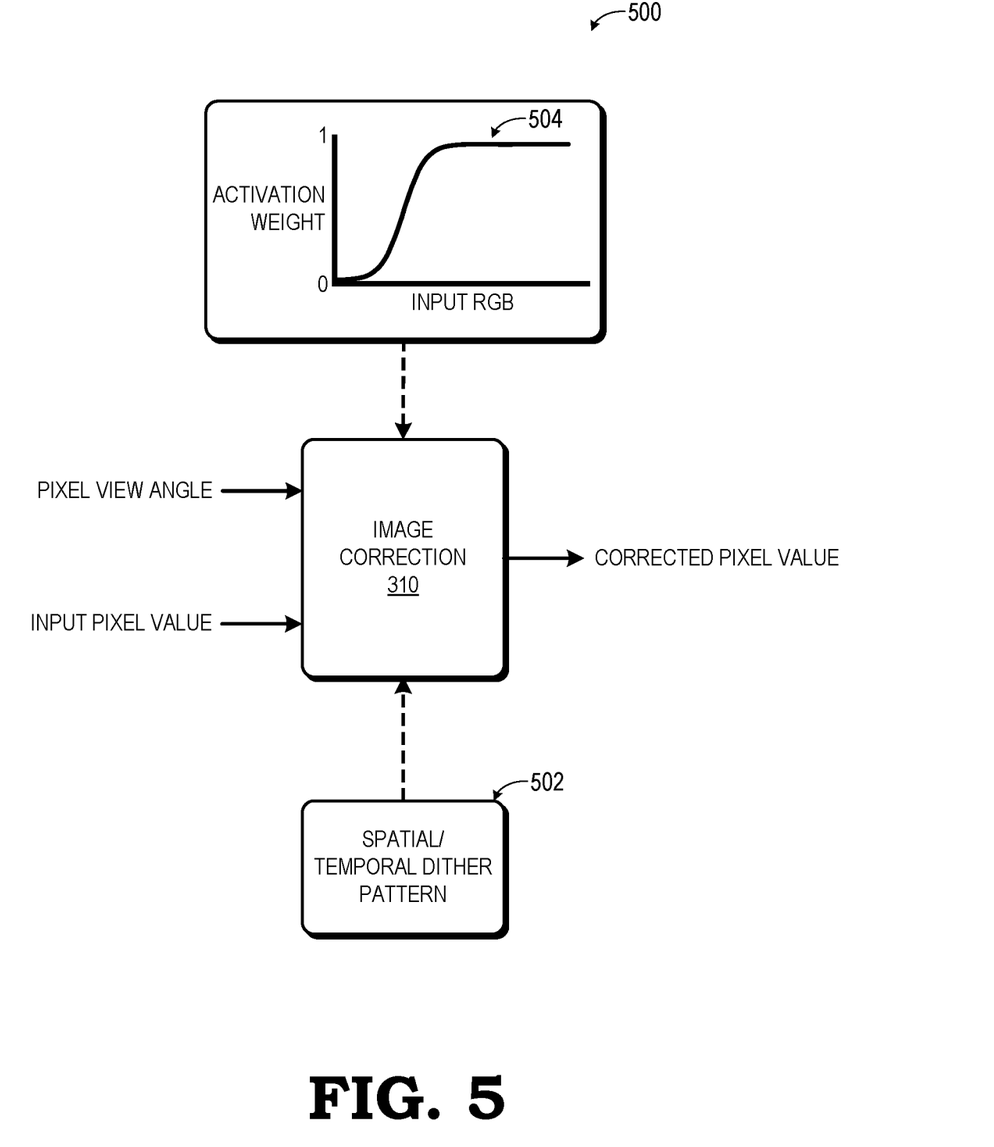
FIG. 5 is a diagram illustrating a technique for mitigating quantization effects during view-angle-dependent image correction in accordance with some embodiments.
Figure 6:
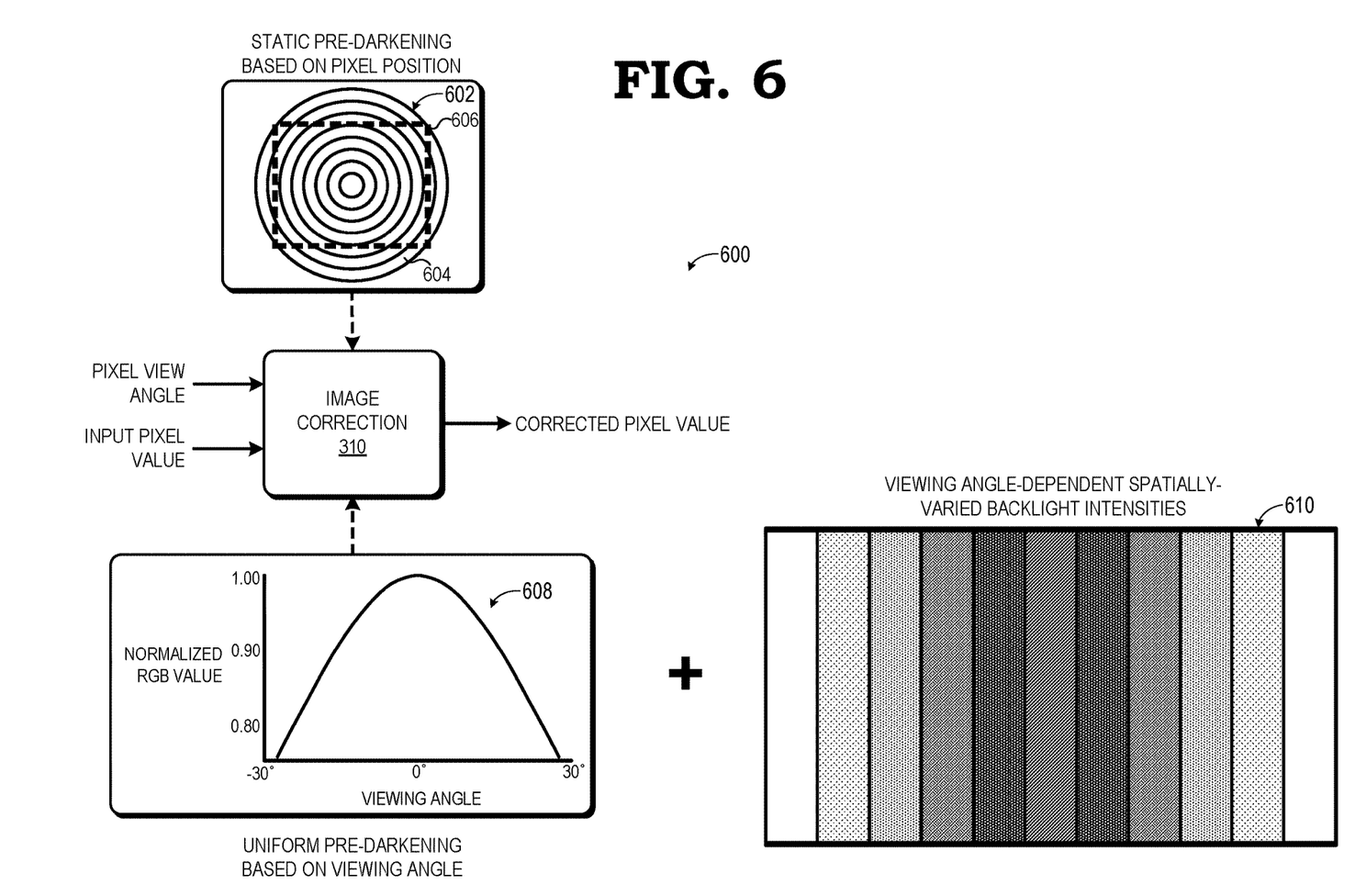
FIG. 6 is a diagram illustrating a technique for mitigating clipping effects during view-angle-dependent image correction in accordance with some embodiments.

The process of adjusting pixel values based on corresponding pixel view angles to pre-compensate for the angle-dependent color/brightness shifts introduced by viewing the pixels at their corresponding pixel view angles can, without precaution, introduce undesirable visual artifacts, including banding due to quantization, clipping, and color unbalancing. FIGS. 5 and 6 illustrate various techniques for mitigating such issues.

As is well-known and reflected in Weber's Law of Just Noticeable Difference, changes in luminance are more readily detectable by a viewer for dark, low-spatial-frequency textures than for lighter, higher-spatial-frequency textures. Accordingly, the quantization effects of updating pixel values based on pixel-angle-view correction can lead to banding artifacts, particularly at lower luminance/color levels. FIG. 5 illustrates a diagram 500 depicting example configurations of the image correction module 310 to mitigate these quantization effects in accordance with some embodiments. In one embodiment, the image correction module 310 employs one or both of spatial dithering and temporal dithering to reduce the quantization effects of angle-dependent pixel adjustments. This generally includes the application of a spatial/temporal dither pattern 502 to pixels so as to introduce "white noise" into the output and thus temper gradient effects. Any of a variety of spatial and/or temporal dither patterns can be employed, such as a Poisson-Disc dither pattern, as may any of a variety of well-known dithering algorithms. In such cases, the image correction module 310 applies a specified dither pattern to the corrected pixel values as they are output from the correction transform component 326 (FIG. 3), and thus introducing randomizing noise into the output pixel stream that then forms the corrected image 322. As banding effects are more likely to be detected at darker pixel values, in some embodiments the image correction module 310 can have a specified pixel value threshold such that the dithering pattern is applied only to those output corrected pixel values that fall below the threshold.

In other embodiments, the image correction module 310 can employ an intensity-weighted activation function 504 to activate angle-dependent correction as the pixel values exceed a specified threshold. Examples of such activation functions include a hyperbolic tangent (tan h) activation function, a sigmoid activation function, a linear activation function, or any of a variety of asymptotic activation functions. In such instances, the image correction module 310 calculates the corrected pixel value as:

$$PV_{corr\_final} = PV_{input} AW * (PV_{corr\_initial} - PV_{input})$$

where $PV_{input}$ represents the input pixel value for a selected pixel of the input image 318, $PV_{corr\_initial}$ represents the angle-corrected pixel value obtained from the correction transform component 326 for the input pixel value, AW represents an activation weight obtained from the activation function 504 based on the input pixel value, and $PV_{corr\_final}$ represents the final angle-corrected pixel value that is used for the selected pixel in the angle-corrected image 322.

Another problem that may arise through the angle-dependent correction process is the clipping of pixels when the output intensity level for an angle-corrected pixel value exceeds the maximum level supported by the display panel 106. FIG. 6 illustrates a diagram 600 of various solutions that can be employed by the image correction module 310 to address such clipping issues. As a general overview, these solutions involve the pre-darkening of pixel values so as to reduce or eliminate the possibility of a corrected pixel value exceeding the maximum supported intensity level. In one embodiment, the pixel values are pre-darkened statically according to the corresponding pixel positions. To illustrate, the image correction transform can utilize a disk-shaped darkening pattern 602 having a plurality of concentric contours 604 logically overlying the display area 606 of the pixel matrix 314, with each contour 604 being associated with a different level of pre-darkening and with the amount of pre-darkening increasing from the exterior-most contour 604 to the inner-most contour 604. Thus, the level of pre-darkening applied to the pixel value of a given pixel depends on the particular contour 604 in which the pixel is located within the darkening pattern 602. The pre-darkening pattern can take other shapes, such as columns of contours, rows of contours, a 2D grid of contours, and the like.

The pre-darkening can be a fixed value for a given pre-darkening level. For example, for RGB888 implementation in which color component values range from 0 to 255, the pre-darkening applied for a pixel in the inner-most contour 604 may be reducing each color component by 20, whereas the pre-darkening applied for a pixel in the outer-most contour may be reducing each color component by only 5. In other embodiments, the pre-darkening is employed as a scaling value, such as a scaling value between, for example, 0.8 and 1. In some embodiments, the pre-darkening process is applied to the input pixel values, such that the input pixel value is pre-darkened and the resulting pre-darkened input value is input to the correction transform component 326 to obtain a corresponding angle-corrected pixel value. In other embodiments, the pre-darkening process is applied to the angle-corrected pixel values as they are output from the correction transform component 326. In either instance, the pre-darkening pattern 602 can be implemented in a LUT or similar data structure in which the pixel position is provided as an input, and the corresponding pre-darkening value to the applied to the pixel value is provided as an output.

Rather than using static position-based pre-darkening, in other embodiments the image correction module 310 uses a uniform pre-darkening that is based on the viewer's viewing angle, rather than pixel position. To illustrate, the image correction module 310 can use a specified viewing angle/pre-darkening relationship, which is illustrated in FIG. 6 as a viewing angle/pre-darkening chart 608 with the viewing angles represented in the abscissa and corresponding pre-darkening scale factors represented in the ordinate, and which can be implemented as a LUT or other similar structure. In this approach, each pixel value is scaled down by the same scale factor, which is determined based on the viewing angle, and which can range between a minimum and maximum scaling factor (e.g., 0.8 to 1.0), with increased pre-darkening scaling as viewing angle increases. As with the position-based static pre-darkening process described above, this pre-darkening scaling can be applied to the input pixel so that a pre-darkened input pixel is used as a basis for determining an angle-corrected pixel value, or the pre-darkening scaling can be applied to the angle-corrected pixel value determined for the original pixel value.

Some display devices provide segmented backlighting in which different regions, such as columns, rows, or 2D blocks, of the backlight can be independently controlled and thus the amount of backlighting can vary between the different regions. In instances wherein the display device 102 supports such segmented backlighting, the display device 102 can leverage this segmented backlighting capability to, in effect, recapture some of the intensity lost through the pre-darkening process so as to provide a nearly "flat" illumination after pre-darkening. To illustrate, in a configuration whereby the pre-darkening pattern is a column-based contour pattern and the backlight 610 of the display device 102 likewise is segmented into columns, the backlighting intensity of each segment can be increased proportional to the amount of pre-darkening employed for the contour co-positioned with the backlight segment. As another example, when using the angle-dependent static pre-darkening, the backlighting intensity can be varied based on the angle of each backlight segment relative to the viewer's head pose such that the less acute the angle (that is, the closer to the viewer's head), the lower backlighting intensity is applied. To illustrate, when the viewer's head is centered in the display, the backlight segments closer to the center are controlled to provide less backlighting, while those further from the center are controlled to provide more backlighting, as illustrated in FIG. 6. When the viewer's head is to one side of the display, the backlight segments on that side are controlled to provide less backlighting, while those on the other side are controlled to provide more backlighting. By varying the backlight intensity in this manner and effectively inversely to the pre-darkening applied to the pixels in the corresponding region, the display device 102 can maintain a substantially flat illumination while mitigating the chances of clipping.

Clipping is particularly problematic when one color component of a pixel value clips while the other color components remain unclipped, and thus results in a changed luminance ratio between the color component values. In such instances, the image correction module 310 can reweight the color components of the corrected pixel value so as to maintain the same luminance ratio of the original pixel value. In doing so, variations in texture may be lost, but the color of the pixel itself will not change from input to corrected value.

Figure 7:
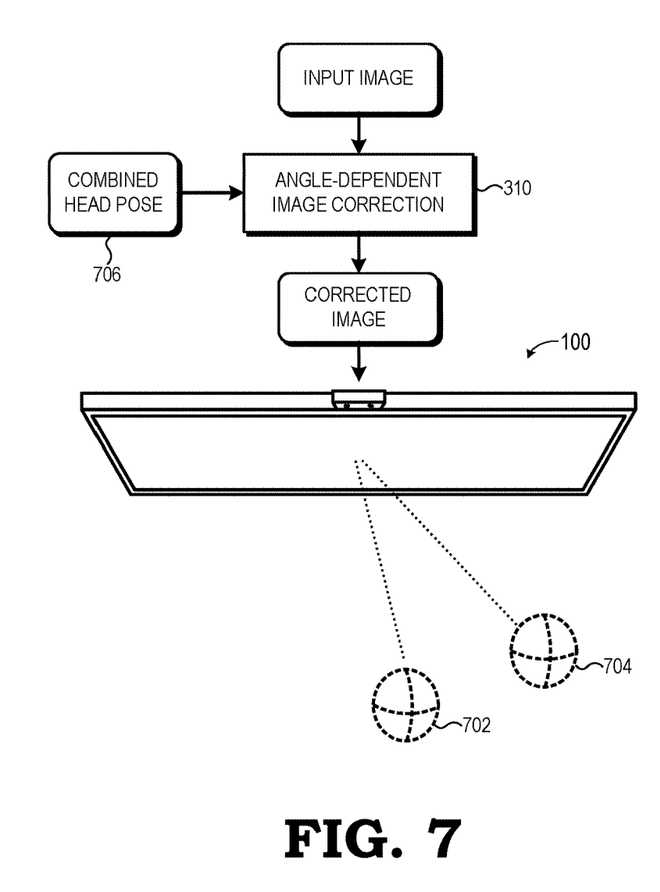
FIG. 7 is a diagram illustrating a display system employing view-angle-dependent image correction for multiple concurrent viewers in accordance with some embodiments.

FIG. 7 illustrates an implementation of the display system 100 for providing angle-dependent image correction when there are multiple simultaneous viewers. In this approach, the tracking subsystem 104 tracks the head poses of the multiple viewers (e.g., viewers 702, 704) and the image correction module 310 determines a combined head pose 706 which is then used by the image correction module 310 to apply angle-dependent image correction to an input image 318 so as to generate an angle-corrected image 322 for display at the display device 102. The combined head pose 706 can be determined from the individual head poses in any of a variety of ways. To illustrate, the individual head poses can be simply averaged. In other embodiments, a weighted averaging algorithm can be employed, whereby each head pose is weighted based on its viewing angle. Still further, certain thresholds can be employed so as to eliminate head poses at extreme viewing angles (so as to prevent the correspondingly extreme angle-dependent corrections from providing a detracting result for a more centrally positioned viewer), and so forth.

Figure 8:
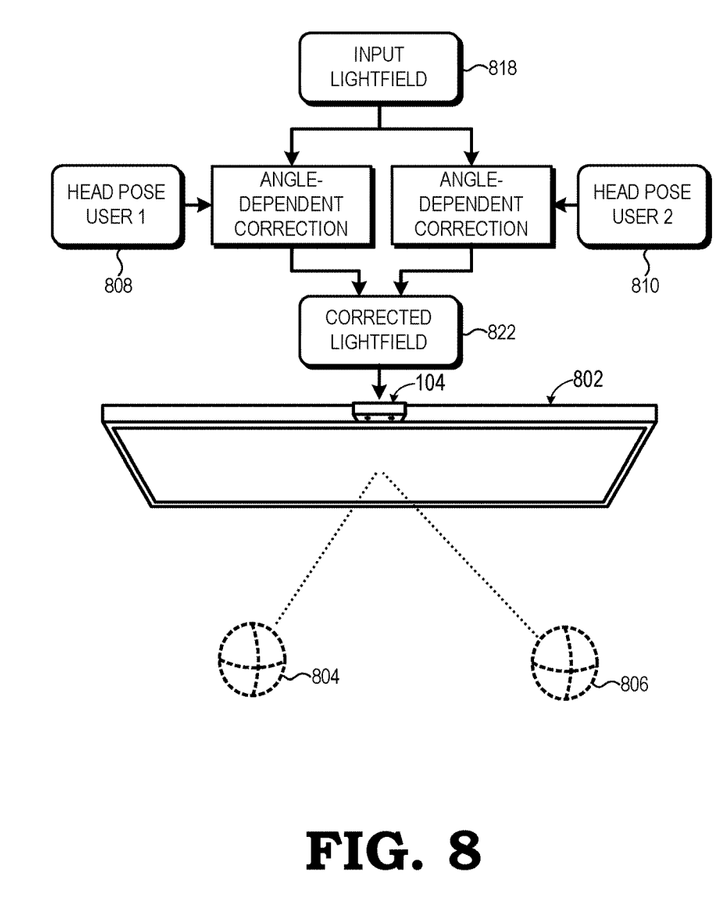
FIG. 8 is a diagram illustrating a display system employing view-angle-dependent correction for one or more viewers of a lightfield display in accordance with some embodiments.

Lightfield displays are particularly suited to multiple-viewer experiences in that they can provide a 3D view of a scene simultaneously to multiple viewers (either a single image to each viewer, or in some implementations, a separate image to each eye of a viewer, and with different left-eye/right-eye image pairs provided to different viewers based on head pose and/or gaze direction of each viewer). As illustrated by FIG. 8, the angle-dependent image correction process can be employed for a lightfield display device 802 (one embodiment of the display device 102, FIG. 1) in that the head pose for multiple simultaneous viewers (e.g., viewers 804, 806) via the tracking subsystem 104. A source system generates or obtains an input lightfield 818 (one embodiment of the input image 318, FIG. 3) and the display device 802 performs a separate angle-dependent correction for each viewer (or for each eye of each viewer if separate images are provided to each eye of the viewer) using the viewer's corresponding head pose (e.g., head poses 808, 810 for viewers 804, 806, respectively) and/or eye pose/gaze direction on the lightfield pixel data representing the rays expected to be perceived by the viewer in the viewer's corresponding position, resulting in a corrected lightfield 822 (one embodiment of the corrected image 322, FIG. 3) having angle-dependent color corrections separately employed for each tracked viewer, which is then provided for display at the lightfield display device 802.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

In the following some examples are described.

Example 1: A display system comprising:
a tracking subsystem configured to track one of a pose of a head of a viewer or a pose of an eye of the viewer;
an image correction module configured to:
for each pixel of at least a subset of pixels of an input image:
determine a pixel view angle for the pixel based on the pose or the gaze direction;
determine a corrected pixel value based on an input pixel value of the pixel in the input image and based on the pixel view angle; and
provide the corrected pixel value for the pixel in an angle-corrected image corresponding to the input image; and
a display panel to display the angle-corrected image.

Example 2: The display system of example 1, wherein the corrected pixel value represents an corrective adjustment to counteract an viewing-angle-dependent brightness or color response of the corresponding pixel of the display panel.

Example 3: The display system of example 1 or 2, wherein the corrected pixel value is at least one of luminance or color.

Example 4: The display system of at least one of the preceding examples, further comprising:
a correction transform component configured based on relationships between pixel luminance and view angle of a pixel of the display panel for a plurality of pixel values; and
wherein the image correction module determines the corrected pixel value using the correction transform.

Example 5: The display system of example 4, wherein the relationships are determined based on one of empirical measurement, simulation, or modeling of the display panel.

Example 6: The display system of example 4 or 5, wherein the correction transform component comprises one of a look up table or an analytical function.

Example 7: The display system of at least one of the preceding examples, wherein the image correction module is configured to apply at least one of a spatial dithering pattern or a temporal dithering pattern to corrected pixel values of the angle-corrected image.

Example 8: The display system of at least one of the preceding examples, wherein the image correction module is configured to use an activation function to selectively correct the input pixel value.

Example 9: The display system of at least one of the preceding examples, wherein the image correction module is configured to pre-darken pixel values of one of the input image or the angle-corrected image using one of: a uniform pre-darkening of the pixel values based on the pose or the gaze direction; and a static pre-darkening of the pixel values based on positions of pixels within the input image.

Example 10: The display system of example 9, further comprising:
a backlight comprising a plurality of independently-controllable segments, wherein the backlight is controlled to compensate for the pre-darkening of the pixels values on a segment-by-segment basis.

Example 11: The display system of at least one of the preceding examples, wherein the display panel comprises a display panel of one of: a television; a smartphone; a tablet computer; a notebook computer; a computer monitor, a near-eye display device; and a lightfield display device.

Example 12: The display system of at least one of the preceding examples, wherein the tracking system comprises a camera-based head-tracking subsystem.

Example 13: A method for implementation in a display system, the method comprising:
tracking one of a pose of a viewer's head or a pose of an eye of a viewer's eyes;
for each pixel of at least a subset of pixels of an input image:
determining a pixel view angle for the pixel based on the pose or the gaze direction;
determining a corrected pixel value based on an input pixel value of the pixel in the input image and based on the pixel view angle; and
providing the corrected pixel value for the pixel in an angle-corrected image corresponding to the input image; and
providing the angle-corrected image for display at a display panel of the display system.

Example 14: The method of example 13, wherein the corrected pixel value represents an corrective adjustment to counteract an viewing-angle-dependent brightness or color response of the corresponding pixel of the display panel.

Example 15: The display system of example 13 or 14, wherein the corrected pixel value is at least one of luminance or color.

Example 16: The method of at least one of the examples 13 to 15, further comprising:
configuring a correction transform component based on relationships between pixel luminance and view angle of a pixel of the display panel for a plurality of pixel values; and
wherein determining the corrected pixel value comprises determining the corrected pixel value using the correction transform.

Example 17: The method of example 16, further comprising:
determining the relationships based on one of empirical measurement, simulation, or modeling of the display panel.

Example 18: The method of at least one of the examples 13 to 17, further comprising:
applying at least one of a spatial dithering pattern or a temporal dithering pattern to corrected pixel values of the angle-corrected image.

Example 19: The method of at least one of the examples 13 to 18, further comprising:
selectively correcting the input pixel value based on an activation function.

Example 20: The method of at least one of the examples 13 to 19, further comprising:
pre-darkening pixel values of one of the input image or the angle-corrected image using one of: a uniform pre-darkening of the pixel values based on the viewer's pose; and a static pre-darkening of the pixel values based on positions of pixels within the input image.

Example 21: The method of example 20, further comprising:
controlling individually-controllable segments of a backlight to compensate for the pre-darkening of the pixels values on a segment-by-segment basis.

Example 22: The method of at least one of the examples 13 to 21, wherein the display panel comprises a display panel of one of: a television; a smartphone; a tablet computer; a notebook computer; a computer monitor, a near-eye display device; and a lightfield display device.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A display system comprising:
a tracking subsystem configured to track at least one of a pose of a head or a pose of an eye of a viewer;
an image correction module configured to:
for each pixel of at least a subset of pixels of an input image:
determine a pixel view angle for the pixel based on the pose of the head or the pose of the eye;
determine a corrected pixel value based on an input pixel value of the pixel in the input image and based on the pixel view angle; and
provide the corrected pixel value for the pixel in an angle-corrected image corresponding to the input image; and
apply at least one of a spatial dithering pattern or a temporal dithering pattern to corrected pixel values of the angle-corrected image; and
a display panel to display the angle-corrected image.

2. The display system of claim 1, wherein the corrected pixel value represents a corrective adjustment to counteract a viewing-angle-dependent brightness or color response of a corresponding pixel of the display panel.

3. The display system of claim 1, wherein the corrected pixel value is at least one of luminance or color.

4. The display system of claim 1, further comprising:
a correction transform component configured based on relationships between pixel luminance and view angle of a pixel of the display panel for a plurality of pixel values; and
wherein the image correction module determines the corrected pixel value using the correction transform.

5. The display system of claim 4, wherein the relationships are determined based on one of empirical measurement, simulation, or modeling of the display panel.

6. The display system of claim 4, wherein the correction transform component comprises one of a look up table or an analytical function.

7. The display system of claim 1, wherein the image correction module is configured to use an activation function to selectively correct the input pixel value.

8. The display system of claim 1, wherein the image correction module is configured to pre-darken pixel values of one of the input image or the angle-corrected image using one of: a uniform pre-darkening of the pixel values based on the pose of the head or the pose of the eye; and a static pre-darkening of the pixel values based on positions of pixels within the input image.

9. The display system of claim 8, further comprising:
a backlight comprising a plurality of independently-controllable segments, wherein the backlight is controlled to compensate for the pre-darkening of the pixel values on a segment-by-segment basis.

10. The display system of claim 1, wherein the display panel comprises a display panel of one of: a television; a smartphone; a tablet computer; a notebook computer; a computer monitor, a near-eye display device; and a lightfield display device.

11. The display system of claim 1, wherein the tracking subsystem comprises a camera-based head-tracking subsystem.

12. A method for implementation in a display system, the method comprising:
tracking at least one of a pose of a viewer's head or a pose of a viewer's eye;
for each pixel of at least a subset of pixels of an input image:
determining a pixel view angle for the pixel based on the pose of the viewer's head or the pose of the viewer's eye;
determining a corrected pixel value based on an input pixel value of the pixel in the input image and based on the pixel view angle; and
providing the corrected pixel value for the pixel in an angle-corrected image corresponding to the input image;
applying at least one of a spatial dithering pattern or a temporal dithering pattern to corrected pixel values of the angle-corrected image; and
providing the angle-corrected image for display at a display panel of the display system.

13. The method of claim 12, wherein the corrected pixel value represents an corrective adjustment to counteract an viewing-angle-dependent brightness or color response of the corresponding pixel of the display panel.

14. The method of claim 12, wherein the corrected pixel value is at least one of a luminance value or a color value.

15. The method of at least one of claim 12, further comprising:
configuring a correction transform component based on relationships between pixel luminance and view angle of a pixel of the display panel for a plurality of pixel values; and
wherein determining the corrected pixel value comprises determining the corrected pixel value using the correction transform.

16. The method of claim 15, further comprising:
determining the relationships based on one of empirical measurement, simulation, or modeling of the display panel.

17. The method of claim 12, further comprising:
selectively correcting the input pixel value based on an activation function.

18. The method of claim 12, further comprising:
pre-darkening pixel values of one of the input image or the angle-corrected image using one of: a uniform pre-darkening of the pixel values based on the pose of the viewer's head or the pose of the viewer's eye; and a static pre-darkening of the pixel values based on positions of pixels within the input image.

19. The method of claim 18, further comprising:
controlling individually-controllable segments of a backlight to compensate for the pre-darkening of the pixel values on a segment-by-segment basis.

20. The method of claim 12, wherein the display panel comprises a display panel of one of: a television; a smartphone; a tablet computer; a notebook computer; a computer monitor, a near-eye display device; and a lightfield display device.

* * * * *